B. C. WILLIAMS.
FOOTBOARD.
APPLICATION FILED MAR. 13, 1920.
1,373,284.
Patented Mar. 29, 1921.
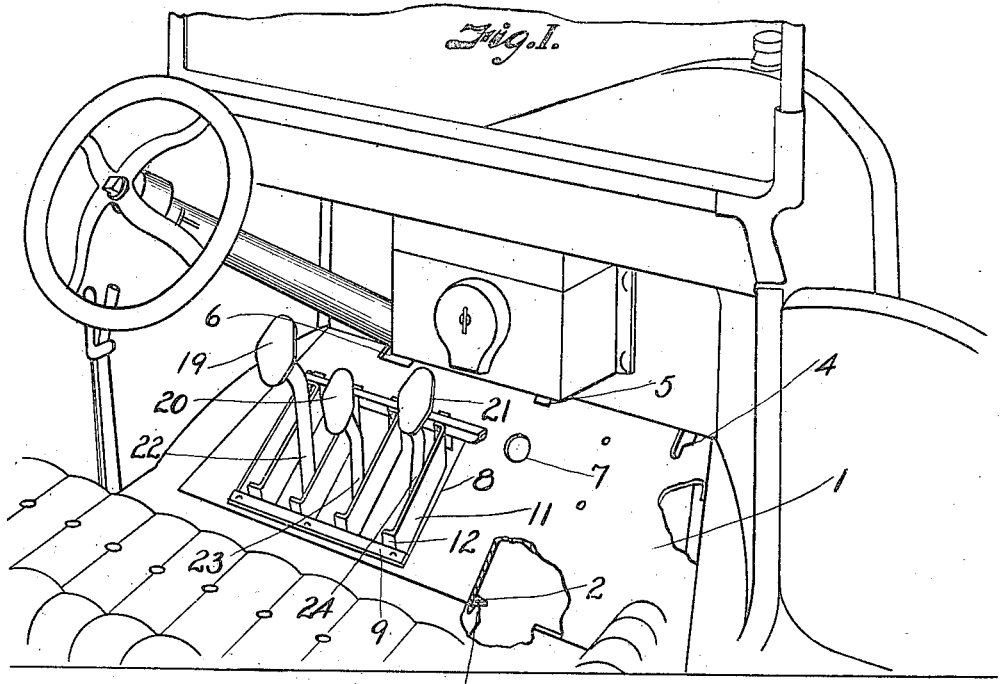
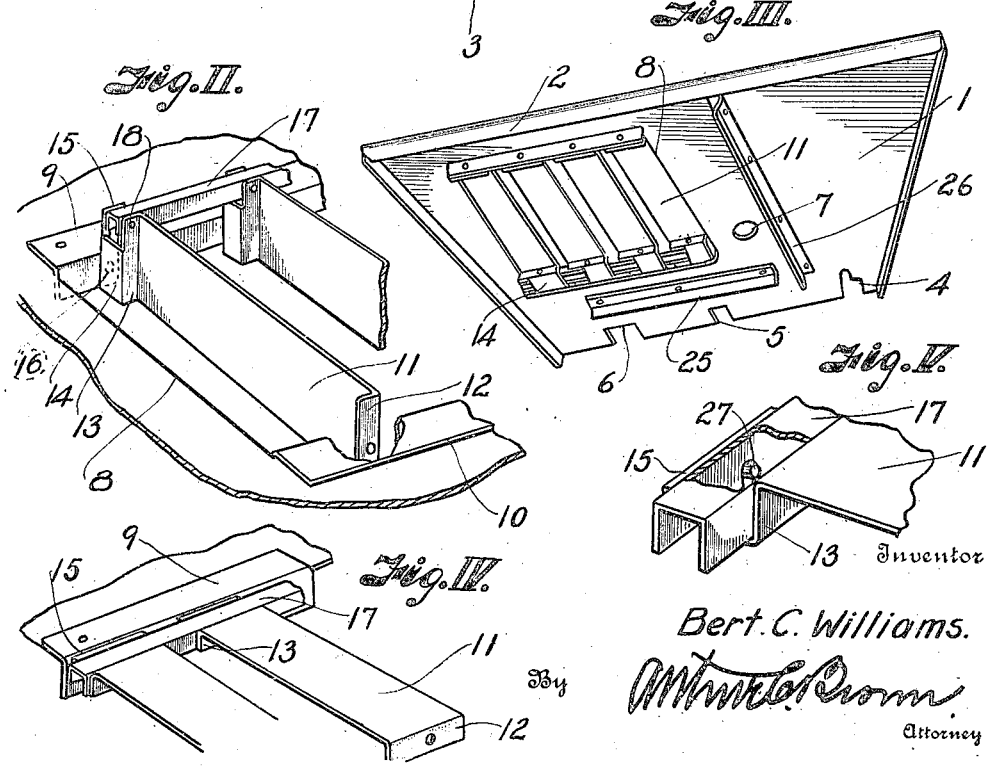
Inventor
Bert. C. Williams.
By
Attorney

UNITED STATES PATENT OFFICE.

BERT C. WILLIAMS, OF KANSAS CITY, MISSOURI.

FOOTBOARD.

1,373,284. Specification of Letters Patent. Patented Mar. 29, 1921.

Application filed March 13, 1920. Serial No. 365,428.

*To all whom it may concern:*

Be it known that I, BERT C. WILLIAMS, a citizen of the United States, residing at Kansas City, in the county of Jackson and State of Missouri, have invented certain new and useful Improvements in Footboards; and I do declare the following to be a full, clear, and exact description of the invention, such as will enable others skilled in the art to which it appertains to make and use the same, reference being had to the accompanying drawings, and to the letters and figures of reference marked thereon which form a part of this specification.

This invention is a continuation of an application filed by me on October 6, 1919, Serial No. 238,722, and it relates to foot boards for vehicles and particularly for motor vehicles.

One of the objects of the invention is to provide an improved foot board which may be easily applied to the vehicle without the necessity of special tools or disarranging any of the parts of the vehicle.

Motor vehicles are usually provided with upstanding pedal levers, on the end of which are the necessary enlargements or pedals by means of which the pedal levers may be operated by the foot of a driver or operator.

It is the purpose of my invention to provide a one-piece foot board which can be readily substituted for the conventional construction of foot board now in use and to so construct the foot board that the necessary openings are provided to permit the passage of the pedals therethrough, the openings being restricted or closed except for slots to permit the operation of the levers, after the foot board is in place.

In the form of motor vehicle shown, I have illustrated three pedal levers with a pedal on each one and I have provided a hatch or opening through which the pedals and levers may pass, the hatch or opening being adapted to be substantially closed by means of pivoted shutters so that the opening in the board is not in excess of that which is required to operate the pedal levers. It will be apparent that this is an advantage since it is desirable to close the opening covered by the foot board as effectually as possible to prevent the introduction of dirt, dust, cold or even heat, through the foot board.

It will also be apparent by reference to the following description in connection with the accompanying drawings that the foot board can be so constructed that it will be merchantable ready for application by simply substituting it for the board previously used.

I have provided means whereby the opening or hatch for the pedal levers may be closed by simultaneously operating shutters so that the hatch or opening may be substantially closed or opened by a single operation of an actuating device for operating all of the shutters.

In the drawings,

Figure I is a perspective view of the forward part of a motor vehicle, showing the foot board applied with the shutters in open position.

Fig. II is a detail perspective view of a pair of the shutters in the hatch in open position.

Fig. III is an inverted perspective view of the foot board with the shutters closed.

Fig. IV is a perspective view of the shutters shown in Fig. II in closed position, and Fig. V is a detail view of one of the shutters.

The floor board is shown as consisting of a flat body or board portion 1, which is preferably made of metal but which may be made of other material if desired. I prefer to use metal since the metal may be stamped into form and I have shown the perimeter of the board 1 as provided with a depending flange 2, adapted to abut against the edge 3 of the floor board opening of the motor vehicle, the flange 2 being slightly in-bent so as to be receivable upon the seat formed by the edge 3 of the floor board receiving opening. The floor board is provided with suitable edge openings 4, 5 and 6 to accommodate certain conventional parts of the motor vehicle and at a suitable position on the board is an opening 7, through which the finger or tool may be inserted to remove the board from its seat when the occasion demands.

As heretofore explained, the essential feature of the floor board is to provide a pedal lever receiving opening 8, which is here shown as substantially rectangular, and along the forward and rear edges of the opening or hatch 8 are shutter brackets, shown as consisting of angles 9 and 10, the lateral flanges of which are fastened to the top of the board and the vertical flanges of which depend through and below the opening or hatch 8 and serve as brackets or hangers for the shutters 11. Each shutter is shown as consisting of a strip having at one end a depending flange or projection 12 to receive a pivot projectable through it and through the member 10, the other end of the strip 11 having a trough-shaped or channel end, consisting of the depending flange 13, the lateral web 14 and the up-standing flange 15. The web 14, however, does not extend the entire length of the flanges 13 and 15 but terminates short thereof so as to provide a bifurcated portion or finger, as will be clearly seen in Figs. II and V. The end opposite to the flange 12 is supported in the depending flange of the angle 9 by means of a pivot which may project through the opening 16 in the flange 15. The bifurcated portion of the channel is connected to an actuator or link 17, which is shown as an inverted channel, the flanges of which are secured to the flanges 13 and 15 through fastening devices 18, which pass through openings in the forwardly projecting ends of the flanges 13 and 15 and through the flanges of the link member 17.

All of the shutters are shown as being connected to the link 17 so that if the link 17 is moved transversely of the vehicle in one direction, all of the shutters will be tilted upon end, as shown in Figs. I and II, to permit the introduction of the pedal levers through the slots bounded by the shutters.

After the heads 19, 20 and 21 of the levers 22, 23 and 24 are introduced through the hatch or opening 8, the link 17 may be moved transversely of the vehicle in an opposite direction so as to swing the shutters about their pivots to make them assume the positions shown in Figs. III and IV so that the hatch or opening is closed except for the slots formed by the space of the shutters and which are necessary to permit the pedal levers 22, 23 and 24 to move longitudinally of the machine during the operation of the vehicle. When the shutters are in closed position, the link 17 will lie in the channels formed by the flanges 13 and 15 in the web 14 and the shutters and member 17 will lie substantially flush with the upper surface of the floor board so that practically an unbroken board will be provided except for the slots above referred to.

The length of the channel member 17 is substantially equal to the width of the hatch or opening 8 so that it may be confined therein during the normal position of the shutters. It is obvious, however, that when the shutters are tilted on edge, as shown in Figs. I and II, the link or actuator 17 will be raised above the floor board, this being only temporary, however, during the application of the board to the vehicle.

The shutters are designed to have their flanges fit tight enough against the hangers so that they will not rattle during the passage of the vehicle over the road bed and they will frictionally engage the hangers so as to hold them in place.

While the device is not necessarily limited to a metal, I prefer to construct the entire board of metal, as sheet metal of sufficiently heavy gage admirably lends itself to such a construction and particularly if the board is enameled, it will be sanitary since it will not absorb objectionable moisture and it may be readily cleaned and danger of breaking or splitting will be eliminated.

If the board is made of metal it can be reinforced by braces, shown as channels 25 and 26.

It will be apparent from the foregoing that the board is simple in construction, can be readily manufactured, that it may be easily applied and detached from the vehicle and that it will admirably serve the purpose for which it is intended.

It will be noticed that the outer flange, channel-shaped actuator or link 17 is provided with notches 27, which are adapted to engage a pivot for the shutter so that it will be locked in place and it will also be noted that the end to the right of the member 17 is inclined so that it may easily move into and out of locking position and ride over the right hand edge of the hatch. When it is in locking position, however, its end will bear against the right hand edge of the hatch so that liability of rattling or moving out of place will be prevented.

What I claim and desire to secure by Letters-Patent is:

1. A foot board having a hatch for the introduction of pedal levers, and spaced shutters pivotally mounted in the hatch and when closed arranged to leave slots for the operation of levers.

2. A foot board having a hatch for the introduction of pedal levers and spaced shutters permanently attached to the foot board and mounted for opening and closing movement and when closed arranged to leave slots for the operation of the levers.

3. A foot board having a hatch for the introduction of pedal levers, pivoted shutters carried by the board to open and close the hatch and when closed arranged to leave slots for the operation of levers, and means for simultaneously actuating all of the shutters.

4. A foot board having a hatch for the introduction of pedal levers, pivoted shutters carried by the board to open and close the hatch and when closed arranged to leave slots for the operation of levers, and a pivoted actuating link connected to all of the shutters.

5. A foot board having a hatch for the introduction of pedal levers, a plurality of hatch-closing shutters in spaced relation and supported by the board, each shutter consisting of a strip having a depending flange pivotally attached to the board, a channel at one end, pivotally attached to the board, and an actuator for all of the shutters comprising a transverse link pivoted to each shutter and receivable within the channel portion thereof.

6. A foot board comprising a member having a depending flange to engage the edge of an opening in the floor of a vehicle, said board having a hatchway opening, hangers carried by the edges of the opening, pivoted shutters carried by the hangers and when closed arranged to leave slots for the operation of levers, and means for actuating said shutters.

7. A foot board having a hatch, depending hangers carried by the edge of the hatch, pivoted shutters mounted on the hangers and when closed arranged to leave slots for the operation of levers, and a link pivotally connected to all of said shutters.

8. A foot board having a hatchway, shutters pivoted in said hatchway, each shutter having an offset portion forming a channel, and an actuating link pivoted to the shutters and receivable in the channels of the shutters.

In testimony whereof I affix my signature.

BERT C. WILLIAMS.